(12) United States Patent  (10) Patent No.: US 9,607,235 B2
Chedeau  (45) Date of Patent: Mar. 28, 2017

(54) IMAGE CROPPING ACCORDING TO POINTS OF INTEREST

(71) Applicant: Facebook, Inc., Menlo Park, CA (US)

(72) Inventor: Christopher Serge Benjamin Chedeau, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/829,859

(22) Filed: Mar. 14, 2013

(65) Prior Publication Data

US 2014/0270533 A1    Sep. 18, 2014

(51) Int. Cl.
  *G06K 9/00* (2006.01)
  *G06K 9/32* (2006.01)
  *G06Q 50/00* (2012.01)

(52) U.S. Cl.
  CPC ........... *G06K 9/3233* (2013.01); *G06Q 50/01* (2013.01); *G09G 2340/04* (2013.01)

(58) Field of Classification Search
  CPC ........ G06T 2207/20132; G06T 7/0081; G06K 9/3233–9/3241; G09G 2340/04–2340/0492
  USPC ....... 382/173, 195, 201, 282, 291, 293, 298, 382/299
  See application file for complete search history.

(56) References Cited

U.S. PATENT DOCUMENTS

| | | | |
|---|---|---|---|
| 6,882,755 B2* | 4/2005 | Silverstein et al. | 382/282 |
| 7,133,571 B2* | 11/2006 | Cheatle | G06K 9/38 382/173 |
| 7,346,212 B2* | 3/2008 | Cheatle | G06T 11/60 382/173 |
| 7,945,653 B2* | 5/2011 | Zuckerberg et al. | 709/223 |
| 8,102,461 B2* | 1/2012 | Choi | 348/345 |
| 8,218,830 B2* | 7/2012 | Gavin et al. | 382/118 |
| 8,218,895 B1* | 7/2012 | Gleicher et al. | 382/275 |
| 8,363,984 B1* | 1/2013 | Goldman | G06T 3/0012 382/298 |
| 8,532,435 B1* | 9/2013 | Hegde et al. | 382/298 |
| 8,570,347 B2* | 10/2013 | Xiang | 345/661 |
| 8,687,887 B2* | 4/2014 | Norimatsu et al. | 382/173 |
| 9,020,298 B2* | 4/2015 | Downing | H04N 1/3872 382/282 |
| 9,336,567 B2* | 5/2016 | Lapointe | G06T 3/403 |
| 9,424,653 B2* | 8/2016 | Gupta | G06T 7/0085 |
| 9,443,306 B2* | 9/2016 | Downing | H04N 1/3872 |

(Continued)

FOREIGN PATENT DOCUMENTS

| | | |
|---|---|---|
| JP | 2012-160950 | 8/2012 |
| KR | 10-0735249 | 7/2007 |
| KR | 10-1201227 | 11/2012 |

OTHER PUBLICATIONS

Vjeux, "Best Cropping Position", https://web.archive.org/web/20130201015702/http://blog.vjeux.com/2012/image/best-cropping-position.html, 6 pgs, Oct. 12, 2012.

(Continued)

*Primary Examiner* — Aaron W Carter
(74) *Attorney, Agent, or Firm* — Baker Botts L.L.P.

(57) ABSTRACT

In one embodiment, a computing device determines one or more points of interest in an image. The computing device selects a viewport position including a pre-determined number of the points of interest. The computing device crops the image based at least in part on the viewport position.

12 Claims, 8 Drawing Sheets

(56) References Cited

U.S. PATENT DOCUMENTS

| | | | |
|---|---|---|---|
| 2002/0114535 A1* | 8/2002 | Luo | G06K 9/3233 382/282 |
| 2005/0207669 A1* | 9/2005 | Kameyama | G06T 5/50 382/274 |
| 2006/0139371 A1* | 6/2006 | Lavine et al. | 345/620 |
| 2006/0193536 A1* | 8/2006 | Pilu | G06K 9/3233 382/298 |
| 2006/0257048 A1* | 11/2006 | Lin | G06K 9/00711 382/276 |
| 2007/0024909 A1* | 2/2007 | Hanechak | G06F 17/211 358/1.18 |
| 2007/0201765 A1* | 8/2007 | DuBois | G06K 9/3233 382/293 |
| 2008/0019574 A1* | 1/2008 | Scalise | G06K 9/00228 382/118 |
| 2008/0091723 A1* | 4/2008 | Zuckerberg et al. | 707/104.1 |
| 2008/0181512 A1* | 7/2008 | Gavin et al. | 382/209 |
| 2008/0215985 A1* | 9/2008 | Batchelder | G06F 17/248 715/731 |
| 2009/0128836 A1* | 5/2009 | Jo et al. | 358/1.9 |
| 2009/0208118 A1* | 8/2009 | Csurka | G06K 9/00664 382/228 |
| 2009/0245626 A1* | 10/2009 | Norimatsu et al. | 382/164 |
| 2009/0295787 A1 | 12/2009 | Yao | |
| 2010/0266208 A1* | 10/2010 | Downing | H04N 1/3872 382/195 |
| 2010/0299627 A1* | 11/2010 | Kenagy | G06T 3/40 715/800 |
| 2011/0096228 A1* | 4/2011 | Deigmoeller | G06K 9/00624 348/441 |
| 2012/0117473 A1* | 5/2012 | Han | G11B 27/034 715/723 |
| 2012/0121204 A1* | 5/2012 | Ding | G06T 3/0012 382/260 |
| 2012/0134595 A1* | 5/2012 | Fonseca et al. | 382/195 |
| 2013/0063626 A1* | 3/2013 | Bocking et al. | 348/240.1 |
| 2013/0147845 A1* | 6/2013 | Xie et al. | 345/660 |
| 2013/0156320 A1* | 6/2013 | Fredembach | G06K 9/4671 382/190 |
| 2014/0184726 A1* | 7/2014 | Kim et al. | 348/14.07 |
| 2014/0270533 A1* | 9/2014 | Chedeau | 382/195 |
| 2015/0161466 A1* | 6/2015 | Welinder | G06K 9/46 382/195 |
| 2015/0213612 A1* | 7/2015 | Lin | G06T 7/0085 382/173 |

OTHER PUBLICATIONS

International Search Report and Written Opinion for International Application PCT/US2014/023518, Jul. 31, 2014.

* cited by examiner

IMAGE CROPPING ACCORDING TO POINTS OF INTEREST

TECHNICAL FIELD

This disclosure generally relates to images in a social-networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a social-networking system may determine one or more points of interest in an image. A point of interest may, for example, include a person (e.g., a user of the social-networking system) or a concept represented within the social-networking system (e.g., a location or a business). In particular embodiments, a viewport position including the maximum number of points of interest in the image may be chosen, and the image may be cropped according to the dimensions of a viewport at this position. The viewport position may, for example, be chosen by testing, at the position of each point of interest in the image, how many points of interest are contained in the viewport.

DESCRIPTION OF EXAMPLE EMBODIMENTS

Figure 1:
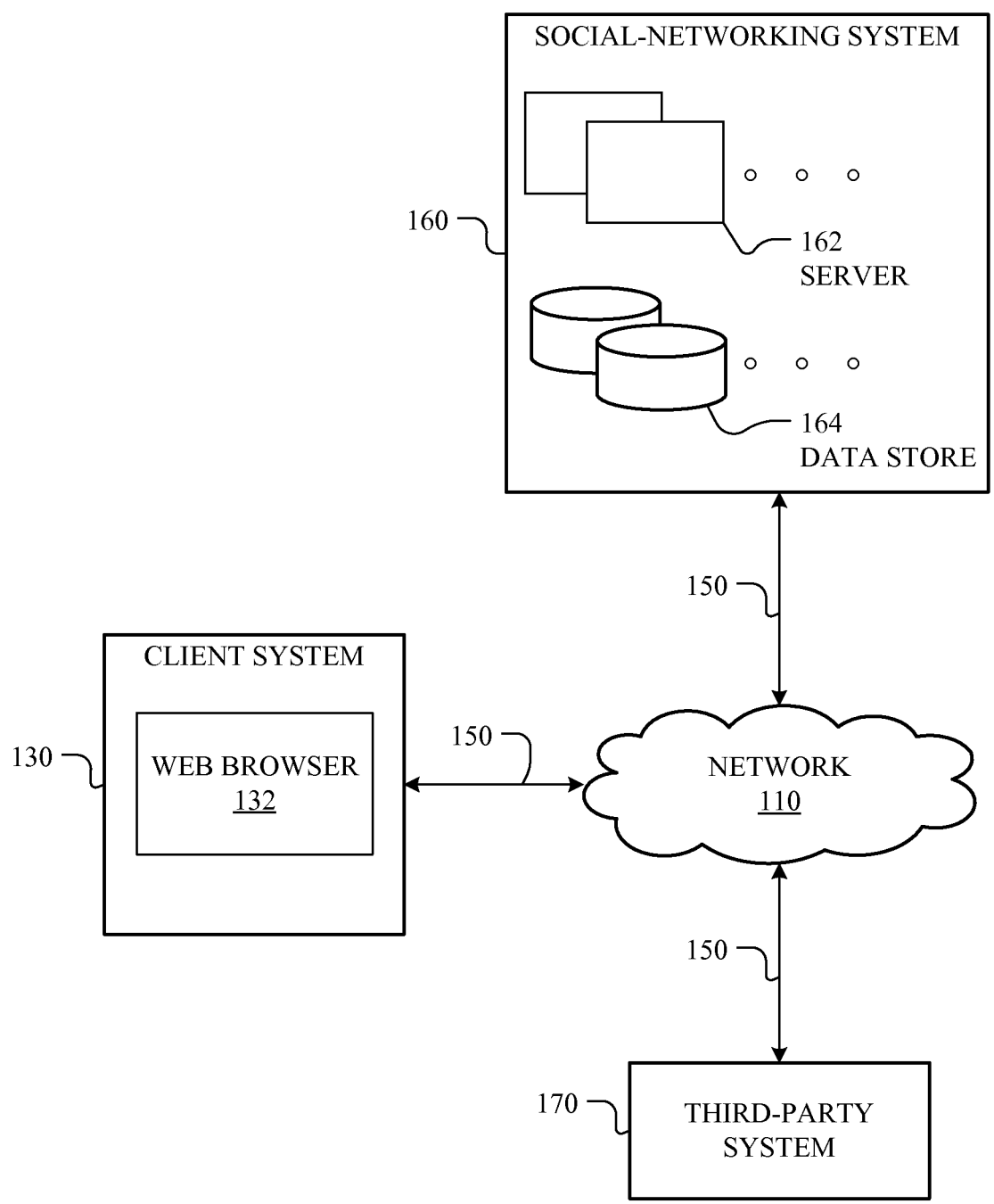
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g. relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g. third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
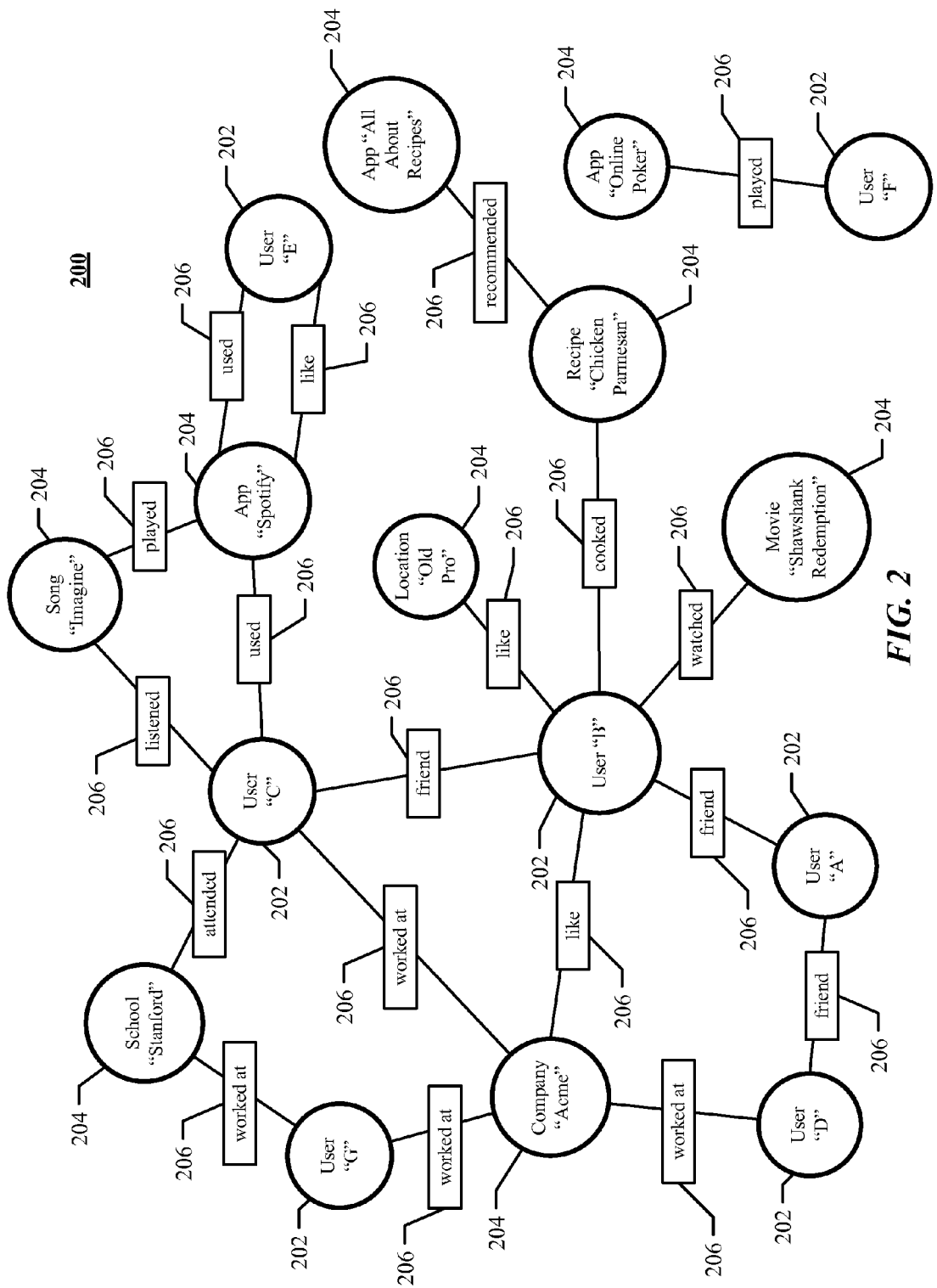
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, one or more images (e.g., stored on client system 130) may be uploaded by a user to social-networking system 160. As an example, the user may manually upload images stored on client system 130 to social-networking system 160. As another example, client system 130 may automatically upload images stored on client system 130 to social-networking system 160 through image-synching (e.g., depending on privacy settings of the user). In particular embodiments, an application or operating system (OS) of client system 130 may upload images to social-networking 160. Social-networking system 160 may also receive images from a third-party system 170, a shared archive or space, or any other image source. A user may designate as private (or otherwise restrict access to) one or more images, or grant access to one or more images to certain other users of social-networking system 160, based at least in part on privacy settings of the user.

In particular embodiments, images that have been uploaded to social-networking system 160 may be associated with metadata on the social-networking system. The metadata may be manually generated by one or more users of the social-networking system. As an example, if an image is a photo including one or more users of the social-networking system, the photo may be "tagged" or labeled (e.g., by the uploading user or by any user of the social-networking system with the permission to do so) with metadata indicating the names or identifiers of users in the photo. As another example, if the image is a photo taken at a particular location or time, the photo may be tagged with metadata including the location (which may, in particular embodiments, correspond to a concept node in the social graph) or with date or time information, as well. Similarly, if the image is a photo that contains buildings, logos or brands, or any other concepts associated with concept nodes in the social graph, the photo may be tagged with metadata including the identifiers of the corresponding concept nodes. In particular embodiments, the metadata associated with an image may be automatically generated by social-networking system 160. As an example, social-networking system 160 may automatically tag an image with metadata including the identifier of the user who uploaded the image. As another example, the social-networking system may automatically detect or recognize one or more faces in an uploaded image. This may, for example, be done using any suitable face-detection or face-recognition algorithm. As an example, a face-recognition algorithm may analyze facial characteristics found in an uploaded image and identify faces based on a comparison to facial characteristics associated with a known set of faces (e.g., the faces of users of social-networking system, as determined from user photos). Based on the faces detected or recognized in the uploaded image, social-networking system 160 may automatically determine that one or more users of the social-networking system are present in the image and may (depending on the users' individual privacy settings) tag the image with metadata including the identifiers of those users present in the image. As another example, the social-networking system may automatically detect or recognize objects, including locations, buildings, logos or brands, or concepts associated with concept nodes in the social graph in an uploaded image (e.g., using any suitable computer vision algorithm or any suitable set of known objects). The social-networking system may automatically tag the image with metadata including the identifiers of those concept nodes in the social graph that correspond to the automatically detected items.

In particular embodiments, images (e.g., images uploaded to social-networking system 160) may be displayed to one or more users of the social-networking system. Images may be displayed, for example, using any suitable image layout algorithm. As an example, images may be displayed in a grid format within a webpage. Each image in the grid may be displayed using a fixed-size viewing region, or "viewport." In certain cases, the size of an image may not be equal to the size of the viewport. In these cases, the image may be displayed to fit entirely within the viewport (e.g., with scaling or the addition of borders), or the image may be cropped to the size of the viewport. Cascading Style Sheets (CSS) may be used to implement either display style, using, for example, the "background-size" property and the "contain" or "cover" values for "background-size."

Figure 3:
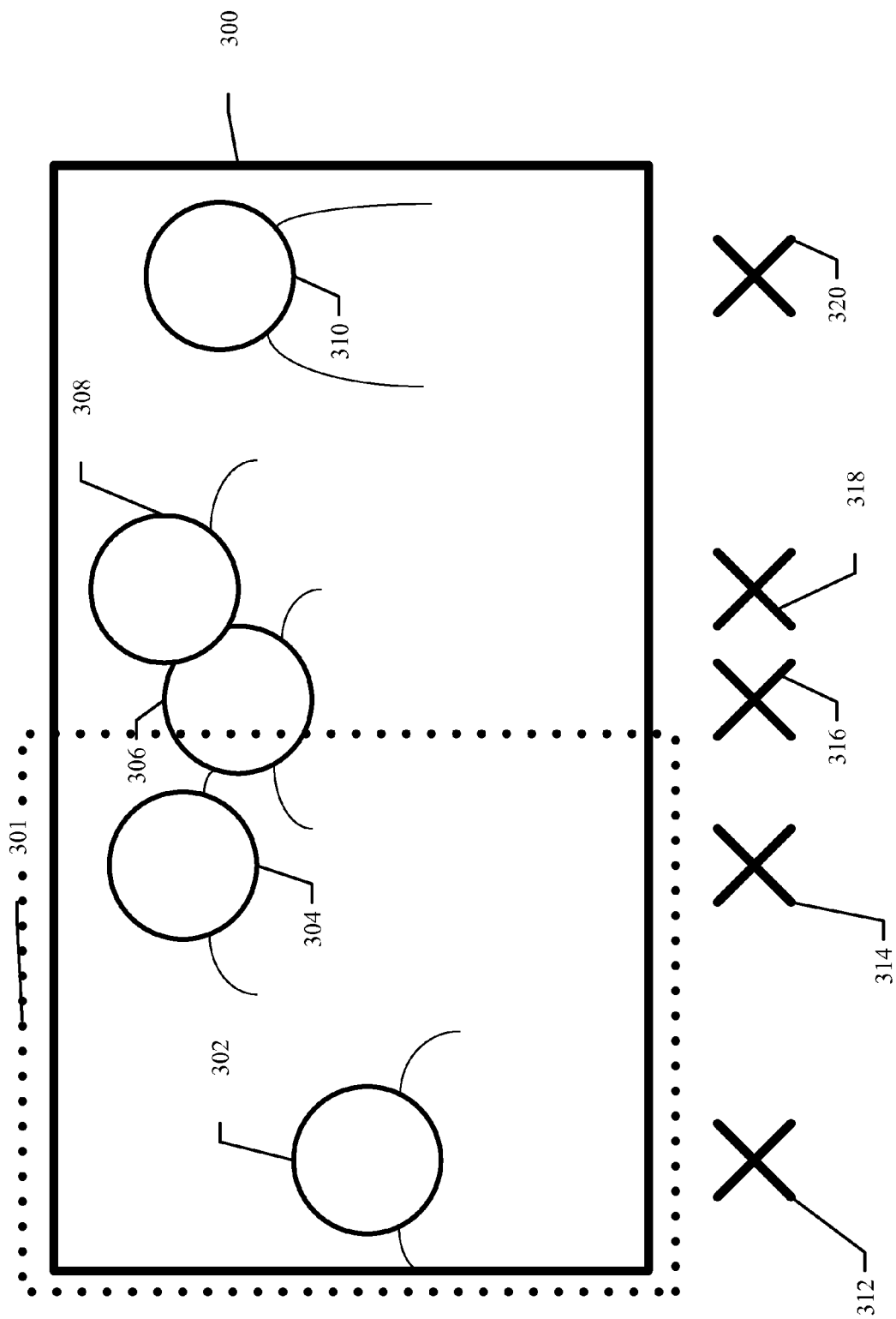
FIG. 3 illustrates an example image with points of interest.

In particular embodiments, an image may be scaled to a particular size (e.g., to equal one or more dimensions of a viewport). The image may, for example, be scaled based on the size or dimensions of the viewport. In the example of FIG. 3, image 300 has a width that is greater than its height (e.g., the aspect ratio of image 300 is greater than 1). In particular embodiments, if the image to be scaled is more "horizontal" than the viewport (e.g., the aspect ratio of the image is greater than the aspect ratio of the viewport), then the image may be scaled to equal the height of the viewport. In the example of FIG. 3, image 300 has an aspect ratio that is greater than the aspect ratio of viewport 301, so image 300 may be scaled to equal the height of viewport 301. In particular embodiments, if the image to be scaled is more "vertical" than the viewport (e.g., the aspect ratio of the image is less than the aspect ratio of the viewport), then the image may be scaled to equal the width of the viewport. An image may, in particular embodiments, be scaled before it is cropped to a particular size (e.g., the size of the viewport).

In particular embodiments, an image may be cropped to a particular size (e.g., the size of a viewport). The image may be cropped based on the locations of one or more points of interest in the image and the size or dimensions of the viewport. In particular embodiments, a point of interest in an image may be associated with or identified by a tag, label, or other metadata associated with the image. A point of interest may include, as examples, a person (e.g., a user of the social-networking system), a portion of a person (e.g., a face), a location, a building, a logo, a brand, text, an object, or a user or concept associated with a node in the social graph of the social-networking system. FIG. 3 illustrates an example image 300 with five points of interest, 302, 304, 306, 308, and 310 which may, for example, correspond to faces of five people (e.g., automatically detected by social-networking system 160 or manually tagged by users of the social-networking system). In particular embodiments, once an image is scaled to equal a dimension of a viewport, the image may be cropped based on the locations of its points of interest along an axis corresponding to a second dimension of the viewport. In the example of FIG. 3, image 300 may first be scaled to equal the height of viewport 301 before image 300 is cropped based on the locations of its points of interest 302-310 along a horizontal axis (corresponding to the width of viewport 301). The locations of points of interest 302, 304, 306, 308, and 310 along the horizontal axis are represented respectively by the Xs marked 312, 314, 316, 318, and 320.

Figure 4:
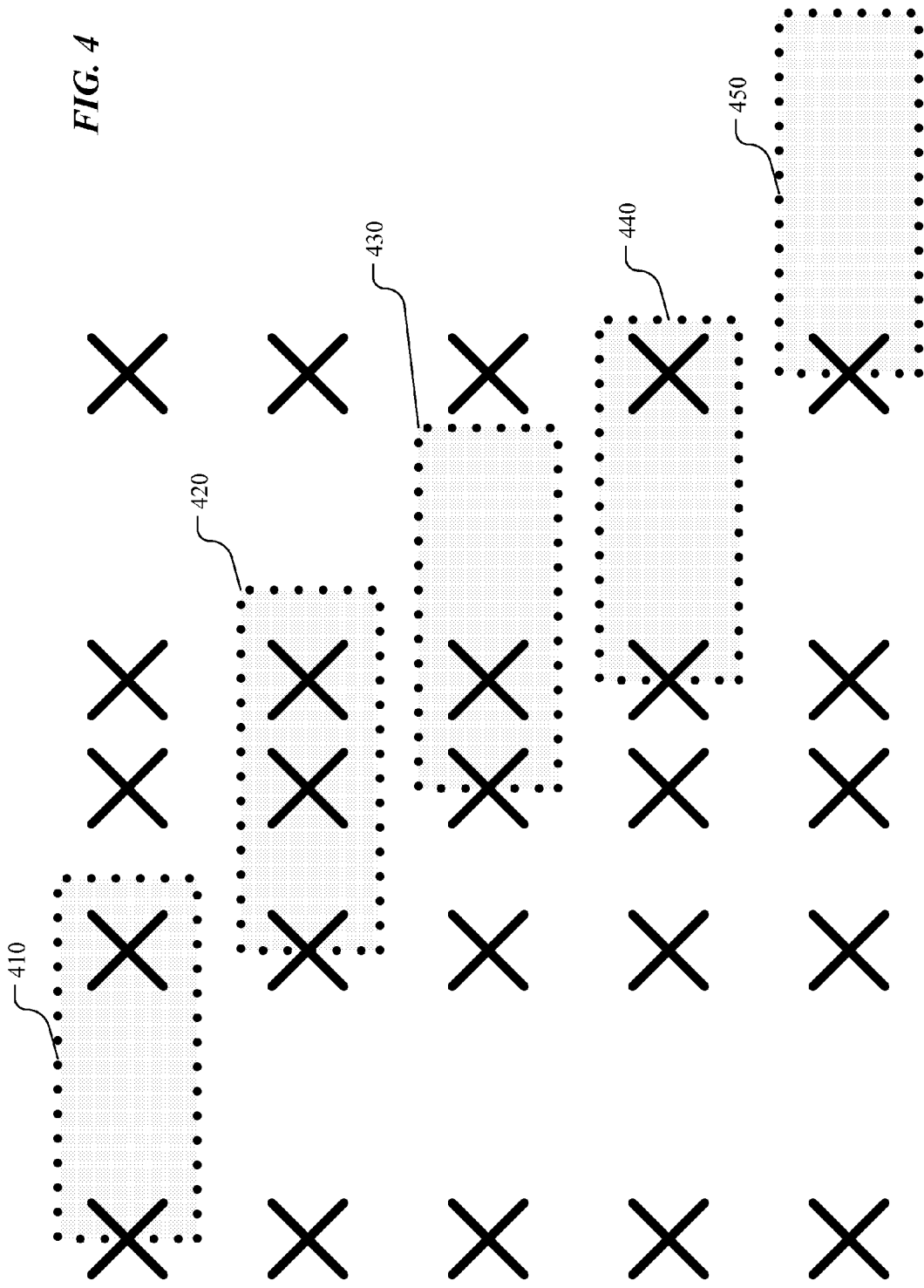
FIG. 4 illustrates example viewport test positions.

In particular embodiments, an image may be cropped to fit a viewport that is positioned to include the maximum number of points of interest of the image. FIG. 4 illustrates five possible viewport test positions 410, 420, 430, 440, and 450 for viewport 301 with respect to locations 312-320 of the points of interest 302-310 of image 300 along the horizontal axis. The width of viewport 301 (the dimension of the viewport corresponding to the horizontal axis) is represented by the width of the shaded box at each viewport test position. In particular embodiments, the number of points of interest falling within the viewport when the viewport is located at each point of interest is determined. The viewport may, for each test position, be located such that a boundary of the viewport (in a particular dimension of the image) coincides with the location of a point of interest. In the example of FIG. 4, the leftmost boundary of the viewport (with respect to the horizontal axis corresponding to the width of the image) is placed at the location of each point of interest. When viewport 301 is located at viewport test position 410, only two points of interest (302 and 304) are within the viewport. When viewport 301 is located at viewport test position 420, three points of interest 304, 306, and 308) are within the viewport. When viewport 301 is located at viewport test position 430, only two points of interest (306 and 308) are within the viewport. When viewport 301 is located at viewport test position 440, only two points of interest (308 and 310) are within the viewport. Finally, when viewport 301 is located at viewport test position 450, only one point of interest (310) is within the viewport. The maximum number of points of interest of image 300 that may fit in viewport 301 is therefore determined to be 3. Thus, viewport test position 420 is determined to be the viewport position including this maximum number of points of interest. Image 300 may be cropped to fit viewport 301 when viewport 301 is located at viewport position 420.

Figure 5:
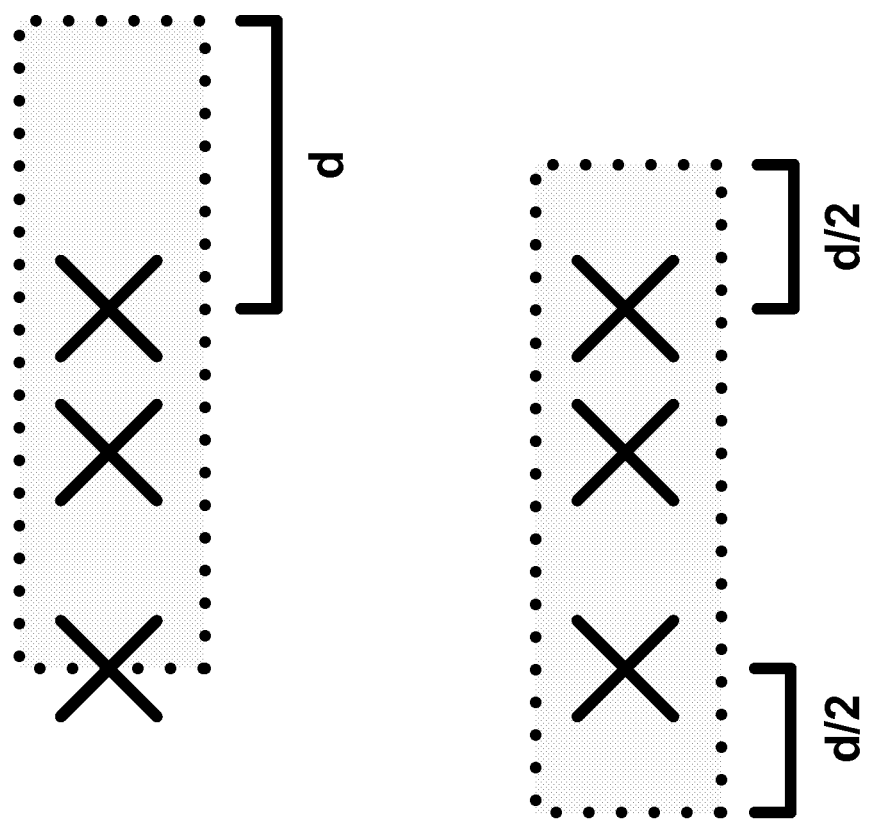
FIG. 5 illustrates example viewport test positions.
Figure 6:
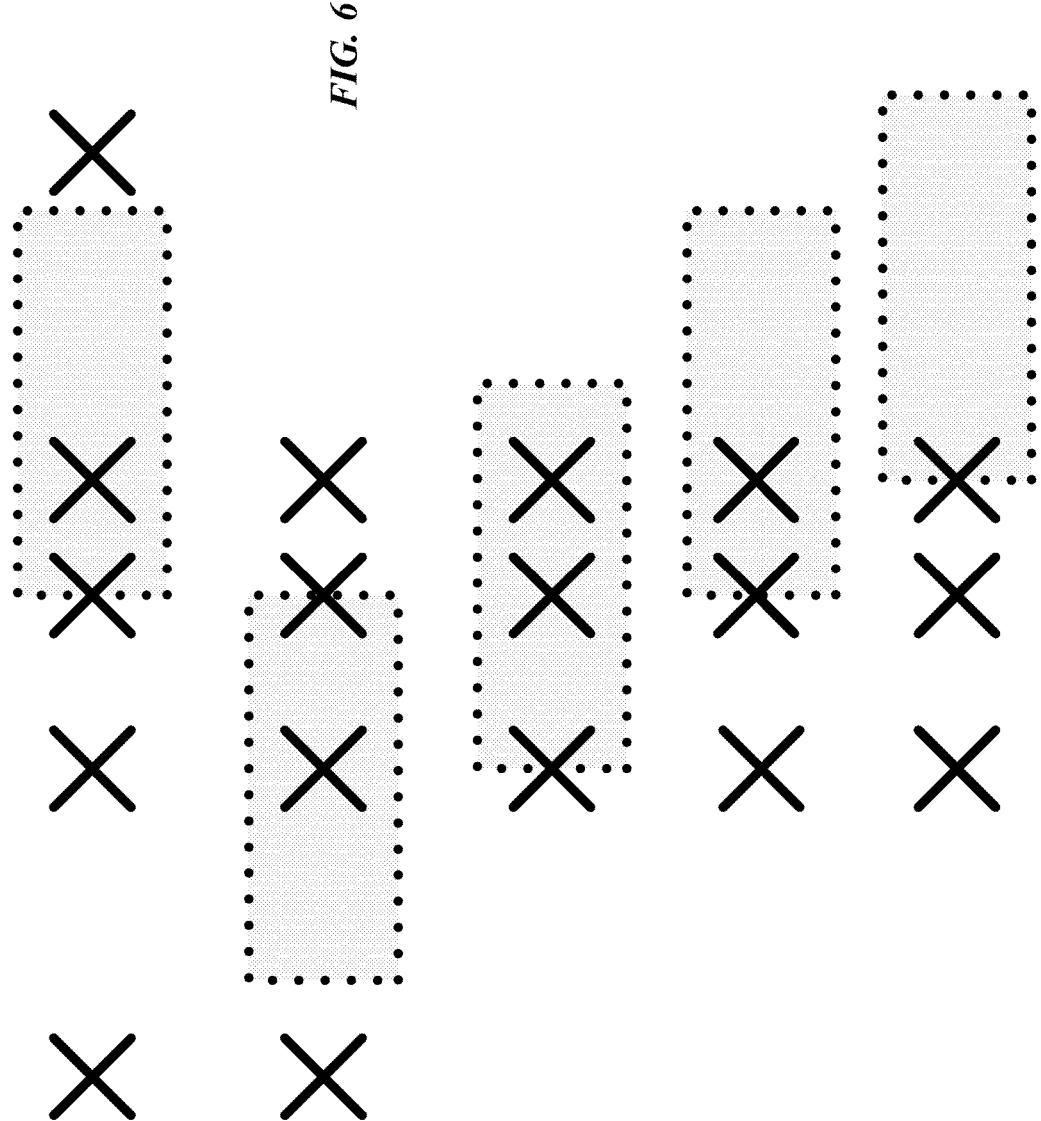
FIG. 6 illustrates example viewport test positions.

In particular embodiments, once the viewport test position including the maximum number of points of interest is determined, the viewport position may be adjusted before cropping the image. As illustrated in FIG. 5, the viewport test position (e.g., 420) including the maximum number of points of interest may not be centered about the points of interest. There may, for example, be an amount of image space or padding "d" that remains in viewport 301. In particular embodiments, a viewport may be repositioned to be centered about the points of interest it contains before cropping the image to fit in the viewport. In the example of FIG. 5, viewport 301 may be centered such that the padding may be d/2 on either side of the three points of interest contained by the viewport. In particular embodiments, if more than one viewport test position includes the maximum number of points of interest, the test position including the most padding (e.g., the test position for which d is greatest) may be chosen as the viewport position for cropping the image. In particular embodiments, one or more of the points of interest may be required to be in the final cropped image. In these embodiments, only those viewport test positions located at points of interest that may be contained in a viewport with the required point of interest may be tested. As an example, in FIG. 6, point of interest 306, corresponding to location 316, is a required point of interest (e.g., it must be in the final cropped image). Because a viewport located at location 316 may not contain both point of interest 306 and point of interest 310 (corresponding to location 320), point of interest 310 and location 320 are removed from the set of viewport test positions. Similarly, point of interest 302 and location 312 are removed from the set of viewport test positions. Thus, in the case when point of interest 306 is a required point of interest, there are only three viewport test positions from which one will be chosen based on the number of points of interest it contains. In particular embodiments, one or more of the points of interest may be assigned a numerical weight or value (based, e.g., on data from social graph 200) such that the viewport test position associated with the highest numerical value (calculated, e.g., by summing the weights or values of each point of interest included in the viewport test position) is chosen as the viewport position for cropping the image.

Figure 7:
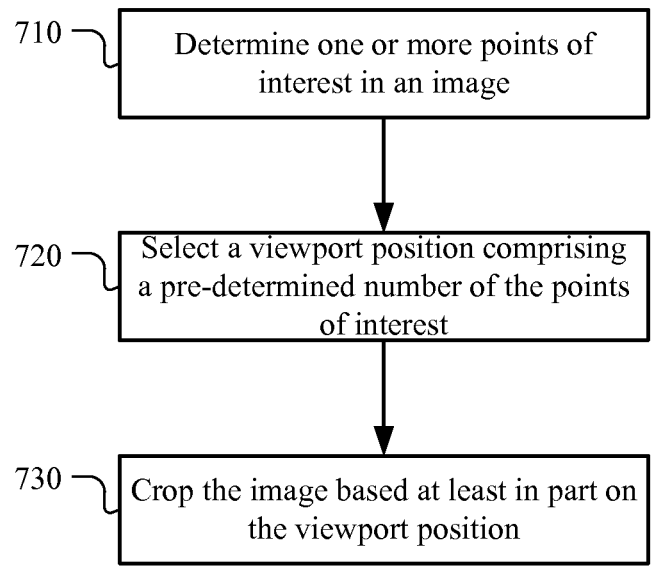
FIG. 7 illustrates an example method for image cropping.

FIG. 7 illustrates an example method 700 for cropping an image according to points of interest. The method may begin at step 710, where one or more points of interest in an image are determined. At step 720, a viewport position comprising a pre-determined number of the points of interest is selected. As an example, the pre-determined number of the points of interest may be the maximum number of the points of interest contained by the viewport when located at any of the viewport test positions. At step 730, the image is cropped based at least in part on the viewport position selected at step 720. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
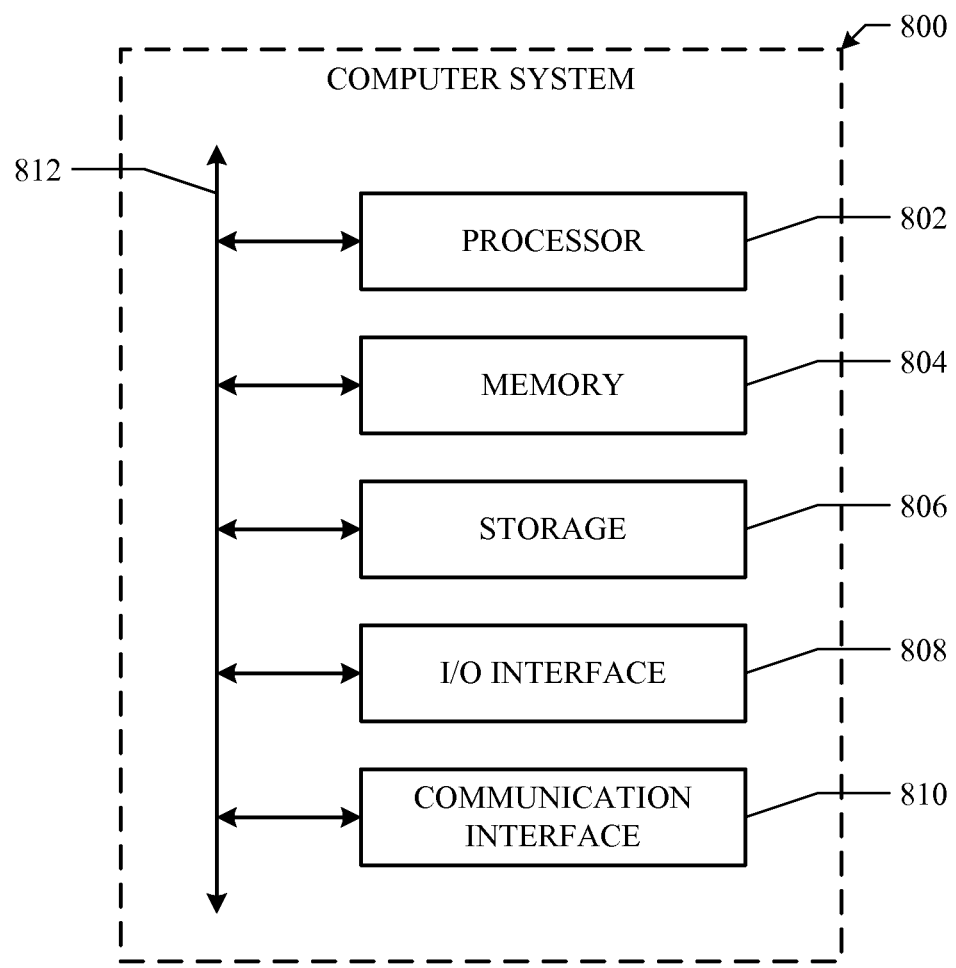
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device, determining one or more points of interest in an image, wherein each of the points of interest corresponds to (1) a user represented by a user node in a social graph of a social-networking system or (2) a concept represented by a concept node in the social graph;

by the computing device, assigning a weight for each of the one or more points of interest in the image based on social-networking information accessed from the social graph of the social-networking system;

by the computing device, analyzing a plurality of viewport test positions, each comprising at least a pre-determined number of the weighted points of interest, wherein the analyzing comprises:

setting boundaries of the viewport test position wherein at least one of the boundaries coincides with a position of one of the weighted points of interest; and identifying any weighted points of interest in the viewport when the viewport is located at the viewport test position;

by the computing device, selecting one of the analyzed viewport test positions based on a respective number of the identified weighted points of interest and their assigned weights, and further based on a padding amount in the viewport; and by the computing device, cropping the image based at least in part on the selected viewport test position.

2. The method of claim 1, wherein at least one of the points of interest comprises at least a portion of an image of a person.

3. The method of claim 1, wherein the at least one of the boundaries is horizontal.

4. The method of claim 1, wherein the at least one of the boundaries is vertical.

5. One or more computer-readable non-transitory storage media embodying software that is operable when executed to:

determine one or more points of interest in an image, wherein each of the points of interest corresponds to (1) a user represented by a user node in a social graph of a social-networking system or (2) a concept represented by a concept node in the social graph;

assign a weight for each of the one or more points of interest in the image based on social-networking information accessed from the social graph of the social-networking system;

analyze a plurality of viewport test positions, each comprising at least a pre-determined number of the weighted points of interest, wherein the analyzing comprises:

setting boundaries of the viewport test position wherein at least one of the boundaries coincides with a position of one of the weighted points of interest; and identifying any weighted points of interest in the viewport when the viewport is located at the viewport test position;

select one of the analyzed viewport test positions based on a respective number of the identified weighted points of interest and their assigned weights, and further based on a padding amount in the viewport; and crop the image based at least in part on the selected viewport test position.

6. The media of claim 5, wherein at least one of the points of interest comprises at least a portion of an image of a person.

7. The media of claim 5, wherein the at least one of the boundaries is horizontal.

8. The media of claim 5, wherein the at least one of the boundaries is vertical.

9. A system comprising:

one or more processors; and a memory coupled to the processors comprising instructions executable by the processors, the processors operable when executing the instructions to:

determine one or more points of interest in an image, wherein each of the points of interest corresponds to (1) a user represented by a user node in a social graph of a social-networking system or (2) a concept represented by a concept node in the social graph;

assign a weight for each of the one or more points of interest in the image based on social-networking information accessed from the social graph of the social-networking system;

analyze a plurality of viewport test positions, each comprising at least a pre-determined number of the weighted points of interest, wherein the analyzing comprises:

setting boundaries of the viewport test position wherein at least one of the boundaries coincides with a position of one of the weighted points of interest; and identifying any weighted points of interest in the viewport when the viewport is located at the viewport test position;

select one of the analyzed viewport test positions based on a respective number of the identified weighted points of interest and their assigned weights, and further based on a padding amount in the viewport; and crop the image based at least in part on the selected viewport test position.

10. The system of claim 9, wherein at least one of the points of interest comprises at least a portion of an image of a person.

11. The system of claim 9, wherein the at least one of the boundaries is horizontal.

12. The system of claim 9, wherein the at least one of the boundaries is vertical.

* * * * *